US007539632B1

(12) United States Patent
Chakrabarti et al.

(10) Patent No.: US 7,539,632 B1
(45) Date of Patent: May 26, 2009

(54) METHOD, MEDIUM, AND SYSTEM FOR PROVIDING ACTIVITY INTEREST INFORMATION

(75) Inventors: Kushal Chakrabarti, Kirkland, WA (US); John D. Rodgers, Seattle, WA (US); Christel C. Berg, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 113 days.

(21) Appl. No.: 11/861,599

(22) Filed: Sep. 26, 2007

(51) Int. Cl.
G06Q 30/00 (2006.01)
G06F 17/30 (2006.01)
G07F 7/00 (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

2006/0129446 A1* 6/2006 Ruhl et al. .................... 705/10
2007/0038620 A1* 2/2007 Ka et al. ......................... 707/5
2007/0294127 A1* 12/2007 Zivov ........................... 705/10
2008/0033781 A1* 2/2008 Peretti .......................... 705/10

OTHER PUBLICATIONS

MindSolve Technologies Links with Amazon.com Business Wire, p. 1569, Jan. 5, 1999.*

* cited by examiner

Primary Examiner—Jeffrey A Smith
Assistant Examiner—Matthew Zimmerman
(74) Attorney, Agent, or Firm—McCormick, Paulding & Huber LLP

(57) ABSTRACT

The present disclosure provides systems and methods for identifying the product pages of an interactive catalog receiving at least one click-through originating from a commentary page and generating a list of products corresponding to the product pages. The method including determining a total number of click-throughs to each of the product pages from the commentary pages during a predetermined period of time and ordering the list in descending order based on the total number of click-throughs. Additionally, the method includes causing the display of the list.

15 Claims, 8 Drawing Sheets

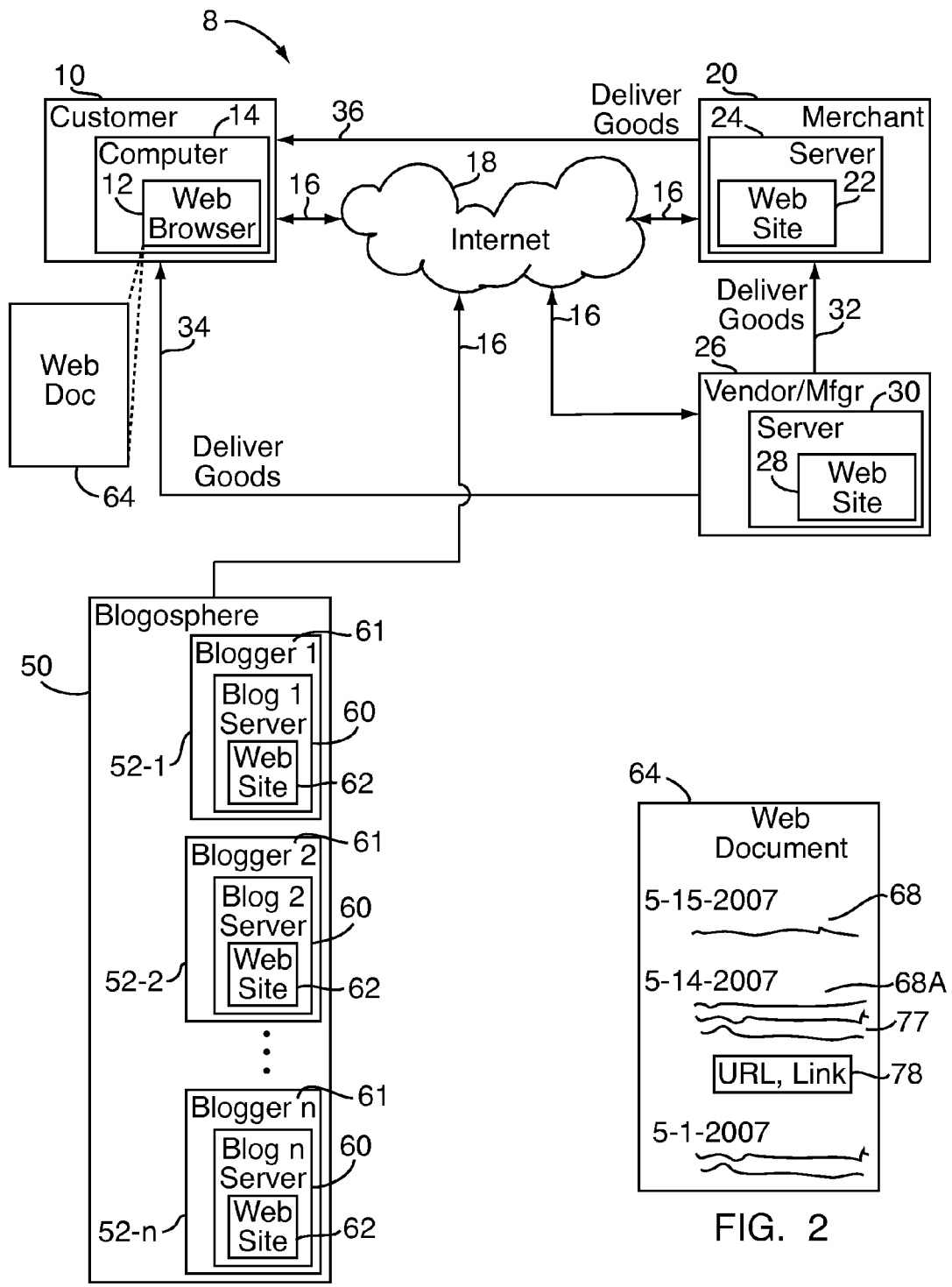

| FIG. 8A |
| FIG. 8B |

US 7,539,632 B1

METHOD, MEDIUM, AND SYSTEM FOR PROVIDING ACTIVITY INTEREST INFORMATION

BACKGROUND

It is now commonplace for consumers (or customers or shoppers or buyers or users) to select goods or products to be purchased, rented or otherwise obtained from remote client-server based suppliers. For example, such suppliers may be e-commerce or Internet-based retailers or merchants, which also may be referred to as an on-line retailer or merchant. For example, on-line retailers have set up on-line Internet web sites where consumers can shop for the products (or items or goods) that are available, purchase or rent the products desired, and have the products delivered to them. These products may be tangible goods, such as groceries, books, CDs, DVDs, tools, clothes, footwear, health/beauty items, hardware, office supplies, pet care products, auto care products, industrial supplies or any other tangible goods that are physically delivered to the customer, or "digital" goods, such as electronic books, music, movies/videos, application software, or any other digital product that is downloaded, copied, transmitted or otherwise electronically transferred to the customer. Items could even be animals or people, such as could be used in an animal adoption (or purchase) context or on a social networking or dating website.

To find a desired product for review or purchase, a customer will often perform a search using search tools available through an interactive catalog such as a merchant website described herein. The search results are typically displayed as a list of products that are related in some way to the search criteria. The customer then selects (or clicks on) a desired product in the list, which causes the website to display details of the selected product, including the product specifications, characteristics, features and/or images of the product. After reviewing the product details, the customer may either buy the product or return to the search results list to select another product to review.

One problem commonly encountered by online merchants is an inability to effectively market goods via their web sites. Because the customer cannot physically inspect the products via the web site, and typically cannot talk to a salesperson, it is desirable that the site provide access to product reviews, product ratings, and other information that can be reviewed and/or relied on by the customer to make an informed decision.

One known method is to provide access via the web site to customer reviews of the products available through the web site. However, customer reviews for a product may not be available, especially for the newest products. Additionally, since most of the customer reviews available through a merchant web site often seem to include only positive reviews as to the products in question, customers may be inclined to give little weight in a decision making process based on the customer reviews offered through a web site of a retailer selling the products.

Moreover, some conventional web merchants do not provide any access to third party reviews and/or comments as to the products offered for sale via an associated web site. Therefore, there is usually little or no access via the web site to any information regarding disadvantages or negative aspects of the featured products.

Additionally, customers searching for a gift, or otherwise searching for a product for which they are not the intended user and/or not too familiar with the subject matter thereof, often have little information on which to base a purchase decision. Even if the features of various products are identified, the advantages and disadvantages of similar products may be difficult to ascertain without a full understanding of the subject matter. Usually, web-retailers provide a product detail page identifying the features of each product offered for sale. However, a listing of a product's features may not be enough information for a consumer unfamiliar with the subject matter to make a decision as to which product best fits his/her needs.

Therefore, conventional techniques for assisting on-line shoppers when reviewing an item or comparing items can be insufficient or one-sided such that customers may be required to search elsewhere to find objective reviews and or comments as to the products available on many web sites or other interactive catalogs. Accordingly, it would be desirable to have a system and method for assisting shoppers that overcomes the limitations and inefficiencies of the conventional approaches that, among other potential benefits, provides current information regarding the available products.

BRIEF DESCRIPTION OF THE DRAWINGS

FIG. 1 is an illustration of one embodiment of a block diagram of the components of a customer-merchant shopping system.

FIG. 2 is an illustration of one embodiment of a web document published on a web log ("blog") site including entries displayed in reverse chronological order.

DETAILED DESCRIPTION

Figure 3:
FIG. 3 is an illustration of one embodiment of a product description page including a selectable button providing a link to a community commentary page in accordance with embodiments of the present disclosure.

The present disclosure provides a method for identifying referral addresses or Uniform Resource Locators (URLs) generating click-throughs to or "hits" on the product detail pages of an interactive catalog from commentary pages, and ranking the products based on the number of hits generated from the commentary pages. The method includes identifying the referral URL for each hit generated on a product page of an interactive catalog, filtering or screening the referral URLs to identify those URLs corresponding to a commentary page having a link pointing to the corresponding product page, and quantifying the number of hits on the product detail page from each of the commentary pages. Additionally, the method includes displaying a community commentary page including a listing of a name and/or a link pointing to each of the commentary pages generating hits on the product detail page for each product. The method can include displaying links to the commentary pages in order of the number of hits generated on the product detail page therefrom.

For purposes of illustration, the systems and methods described herein will be described primarily in the context of a web site that provides functionality for users to browse and make purchases from an electronic catalog; however, as will be recognized, the disclosed systems and methods may also be used in numerous other environments.

In another aspect, the present disclosure provides a product listing including displaying an image or product description of each of a plurality of products featured or offered for sale via an interactive catalog in descending order based on a number of hits generated at the product detail page originating from a commentary page having a link to the product detail page. The product listing including an associated referral listing identifying or providing a link pointing to each of the articles or entries of the commentary pages having links pointing to the product description page of the corresponding product.

A community commentary page in accordance with the present disclosure provides credible insight as to a product authored by uninterested third parties to customers of a merchant web site or other interactive catalog. In an illustrated embodiment, hits incident on the product pages of a merchant web site originating from commentary pages such as web logs or "blogs" are monitored for identifying for the customers of a merchant web site those products causing the most discussion or "blog buzz" in the market place at the present time. Thus, the hottest or most talked about products are easily identifiable via a community commentary page in accordance with the present disclosure. Additionally, the sources of the hits are identified and made accessible to the customers of the web site.

In other embodiments, other types of commentary pages could be monitored to identify a number of hits generated therefrom. Thus, although an illustrated embodiment is directed to a commentary page referred to as a web log, or blog or blog web site, the disclosure is not limited in this regard as it is generally directed to any type of "commentary page" wherein an author, or reader, or user thereof renders a comment about one of the products or other goods or services available via an interactive catalog.

For example, customer Sally is shopping for a new book to read via a merchant web site and wants to select a book that others have recently read and liked. Sally sees a link labeled "Most Blogged About Books" on a page of the merchant web site directed to books (referring to those books creating the most hits on the merchant web site from one or more blog sites). Sally then clicks on the link which causes the display of a "community commentary-books" page which includes a product listing for certain books available via the merchant web site that have been referred to or discussed on at least one blog site or within a blog entry. The books featured on the community commentary page are featured in descending order based on the number of hits generated on a product detail page for the corresponding book that originates from a blog site. For example, the first product listing may be directed to the book *Harry Potter and the Deathly Hollows* and include an image of the book and a blog address or Uniform Resource Locator (URL) listing which includes a list of URLs for blogs that refer to, or include a discussion of the Harry Potter book. The blog URL listing includes URLs to numerous blogs in descending order based on a number of hits on the product detail page for the featured book on the merchant web site that originate from the corresponding blog site. Each entry in the blog URL listing includes a link to a particular blog entry referencing the subject product or including a link to the product detail page therefor. Sally then clicks on the first blog URL in the listing which causes the display of a blog entry wherein the subject Harry Potter book is discussed and a link to the product detail page on the merchant site is embedded in the blog entry or displayed elsewhere on the blog site. Sally reviews the blog entry and thereafter clicks the back button on her browser to return to the merchant web page presenting the blog URL listing. Thereafter, Sally clicks on another blog URL in the listing and reviews another corresponding blog entry directed to the Harry Potter book that is subsequently displayed on her customer computer via the web browser thereon. Following a review of a few blog entries related to the Harry Potter book, Sally decides to purchase the book. She then clicks on the image of the Harry Potter book on the community commentary page which causes the display of a product detail page for the Harry Potter book. Sally purchases the book via the product detail page and arranges for the book to be shipped to her home.

In another aspect, the disclosed method includes determining a blog score for each of the products featured on a merchant web site based on the number of hits received at the web site that are generated from one or more blog sites.

The blog score providing a means to identify the products creating the most "blog buzz" over a period of time. As the time period is decreased, (e.g. the last one hour, one day, three days, one month, etc.), the blog score can be utilized to identify the hottest products available on the merchant web site at a given time or over a period of time.

The disclosed method includes providing a customer of a merchant web site direct access to current blog entries referencing the products available via the merchant web site. Links are provided to the blog web sites, such that the blog entries referring to a particular product are made available to the user directly from the blog web site and as the material was originally published thereon. Further, the hits incident the merchant web site are monitored to determine which products are creating the most blog buzz at a given time.

FIG. 1 illustrates the various components of an embodiment of a customer-merchant on-line ordering system 8, which includes a customer 10 (or consumer or client or shopper or buyer) and an on-line (or e-commerce or Internet-based) merchant (or supplier or retailer or seller or reseller or distributor) 20. The customer 10 can be any entity or individual that wishes to review or purchase goods (or products) or services from the on-line merchant 20. The customer 10 uses a web browser 12 running on a computer 14. The merchant 20 is an entity that sells goods/services from a merchant website 22 which is implemented using one or more physical computer servers 24. The customer computer 14 is connected to or communicates with the merchant server 24 through a communications network 18, such as the Internet, as indicated by lines 16, by sending and receiving digital data over the communications network 18. The customer 10 uses the web browser 12 as a user interface to view and/or communicate with the merchant website 22 that is displayed on the customer computer 14 allowing the customer 10 to interact with the merchant website 22.

In addition, one or more of the goods ordered by the customer 10 may be manufactured by or obtained from one or more third party vendors (or manufacturers) 26. In some cases the merchant 20 and the vendor 26 may be a single entity. The vendor 26 is an entity that manufactures goods or has access to goods that the merchant 20 desires to supply to the customer 10 and may sell the goods to the merchant 20 through a vendor website (or other type of order processor) 28, which is implemented using one or more physical computer servers 30. The vendor computer server 30 is connected to or communicates with the merchant server 24 and the customer computer 14, through the communications network 18, as indicated by lines 16. If used by the merchant 20, the vendor 26 may deliver the desired goods to either the merchant 20 or to the customer 10, as indicated by the lines 32, 34, respectively. If the goods are delivered to the merchant 20 from the vendor 26, the merchant 20 delivers the goods to the customer, as indicated by a line 36. There may be more than one vendor 26 that supplies goods to the merchant 20 and/or the customer 10.

Additionally, a "blogosphere" 50 includes multiple web log sites or "blog sites" or "blogs" 52 such as blog 1 (52-1) through blog n (52-n) which are connected to the communications network 18 by lines 16 and thereby in communication with the merchant server 24 and the customer computer 14. As is known, blogs by themselves are the published text of an author's (or bloggers 61) thoughts (e.g., news, commentary, reviews, etc.). However, authors also read and comment on other author's blogs and websites, including providing links and/or cites to other web sites. These relationships between various blogs comprise a shifting Internet-wide social and cultural network referred to as the blogosphere. Blogosphere 50 can include entries from individual authors as well as entries written by authors employed by news organizations or other entities. Typically, each of the blog sites 52 include a blogger 61 (e.g., one or more authors), a blog server 60 (similar to the servers 24) and a blog website 62 (collectively referred to herein as a blog site 52). The customer 10 uses the web browser 12 as a user interface to view and/or communicate with the blog websites 62.

Referring to FIGS. 1 and 2, the blog websites 62 provide a "blog" or "web log" or web document 64 which is created and managed by an entity or individual (or "blogger") and which can be requested, retrieved and viewed by the customer 10 via the customer computer 14 and web browser 12. The web document 64 includes blog entries 68 displayed in a reverse chronologically ordered list of commentary and/or news related to a particular topic such as food, politics, goods/services, etc. A typical blog entry 68 may include a combination of text, images, and links to other blog sites, web pages, and/or other media related to a particular topic. By viewing and/or publishing blog entries 68 on a blog website 62 via customer computer 14, the customer 10 interacts with the blog website 62 and blogosphere 50. The ability for blog readers/users such as customer 10 to view and/or publish blog entries 68 in an interactive format is one possible feature of blog websites 62.

Still referring to FIG. 2, the web document 64 includes a blog entry 68A including a user comment 77 or other information related to a product 75 (FIG. 3), or other consumption, such as rentals or digital downloads, offered for sale via the merchant website 22. A hyperlink or link 78 is included with, or embedded in the blog entry 68A pointing to a URL or other destination address associated with the merchant website 22 and the product 75. In one embodiment, the link 78 points to a URL for a product detail page 80 available via the merchant website 22 for use in connection with the sales of the product 75. (See FIG. 3). FIG. 3 is an illustration of one embodiment of a product detail page 80 for the product 75 which is displayable on the customer computer 14 via the web browser 12.

The product detail page 80 includes inter alia, an image 82 of the product 75, a description 84 of the product including a link 85 to a further detailed description of the product. Additionally, the product detail page 80 includes ordering information for the product 75 as well as numerous links to various other web pages which may be in some way related to the product 75. For example, links may be provided to the product detail pages for accessories compatible with the product 75, or other similar or related products. Further, the product detail page 80 includes a customer review link 86 pointing to a web page containing various customer reviews associated with the product 75.

Still referring to FIG. 3, the product detail page 80 also includes a community commentary button 90 for the product 75 which includes a user selectable link pointing to a webpage, referred to herein as a community commentary page within the merchant website 22 (discussed hereinafter with FIG. 4). The community commentary page provides the customer 10 access to blogs, news, and/or reviews generated by persons other than the merchant, having entries that discuss or include information related to the product 75. Accordingly, current information and/or discussions in the blogosphere 50 related to the product 75 are available for review by the customer 10 via the community commentary button 90. The community commentary page can be maintained on a web site or web page separate from the merchant website 22 and accessible thereto via the Internet or another network.

In the illustrated embodiment, the community commentary button 90 points to a community commentary-books page 92A wherein a plurality of books offered for sale via the merchant website 22 and identified in one or more blog web sites 62 are featured. (See FIG. 4). (In the FIG. 4 embodiment, the community commentary page is entitled: Blog Zeitgeist Books). The link at the community commentary button 90 points to a product listing 94A entry on the community commentary-books page 92A corresponding to the product 75. In another embodiment, the link at the community commentary button 90 can point to the top of the community commentary-books page 92A wherein a user may have to scroll through a plurality of product listings to the listing for a desired book. In another embodiment, the community commentary-books page 92A can include a separate page for each book featured on the merchant web site 22 and identified or referred to in one or more blog web sites 62 wherein the community commentary button 90 points to the web page featuring the desired book.

Figure 4:
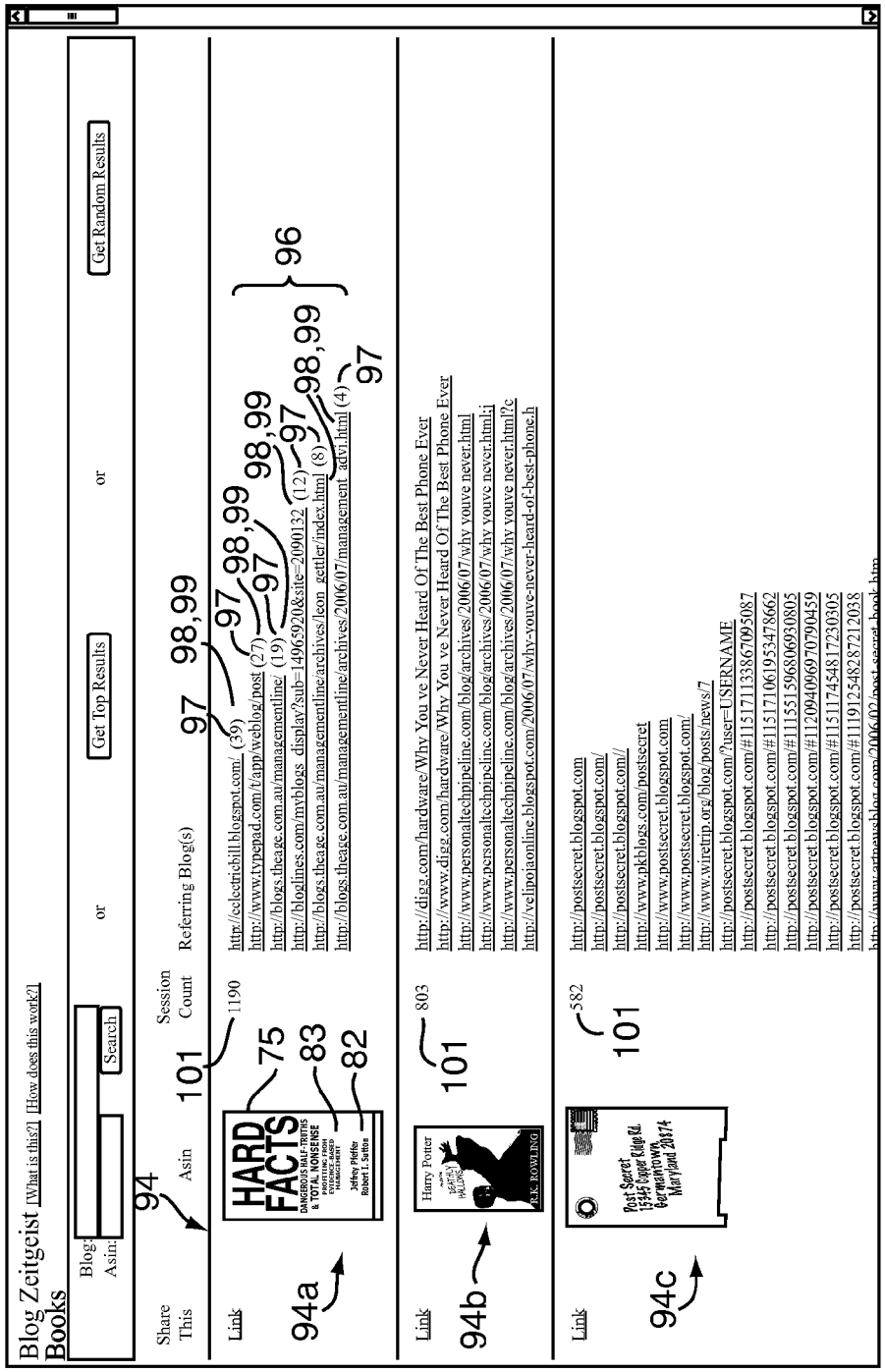
FIG. 4 is an illustration of one embodiment of a community commentary page in accordance with embodiments of the present disclosure.

Referring to FIG. 4, the community commentary-books page 92A includes a product listing 94 for each of a plurality of books featured or offered for sale on the merchant website 22 which have been identified or discussed on a blog web site 62. The blog web sites 62 each include a blog entry 68 identifying the product 75 and providing a link 78 to the merchant website 22 and/or product detail page 80 as shown in the web document 64 (See FIG. 2). The product listing 94A is directed to the product 75, e.g., the book *Hard Facts, Dangerous Half-Truths And Total Nonsense: Profiting From Evidence Based Management* by Jeffery Pfeffer and Robert I. Sutton and includes an image 82 of the product. The image 82 is configured to include a link 83 pointing to the product detail page 80 (FIG. 3) of the merchant website 22 for the product 75. Additionally, the product listing 94A includes a Referring Blog(s) listing 96 including a listing of one or more blog URLs 98. In the FIG. 4 embodiment, Referring Blog listing 96 includes blog links 99 pointing to various blog web sites 62 and pages thereof which include a blog entry 68 referring to the product 75 and/or including a link 78 to the product detail page 80 for the product 75. (See FIG. 2). The blog URL 98 may include a link to the specific article (e.g., a "permalink") wherein the blog link 99 points to a specific blog entry 68 even if the blog entry is no longer located on a front page of the blog web site 62. In some embodiments, the blog URL 98 may include a blog link 99 pointing to the head of the referral blog web site 62.

In one embodiment of the present disclosure, the community commentary-books page 92A displays the product listings 94 in descending order based on the total number of hits or click-throughs, to the product detail page 80 (FIG. 3) for the associated product from the blogosphere 50. This is distinguished from, for example, ranking the product based on the number of articles referring to the product. Thus, according to this example, the products that have been clicked-through the most from blog articles appear as the top entries on the community commentary page 92A. This may be limited by session, where only a single click is counted over a period of time regardless of the actual number of clicks during that time period. In other embodiments, the product listings 94 can be displayed in alphabetical order or arranged randomly or otherwise presented in an ordered or non-ordered listing.

Further, the blog URL listing 96 includes the blog URLs 98 displayed in descending order based on the total number of hits to the merchant website 22 from the corresponding blog web sites 62. The number presented in parenthesis 97 following each blog URL listing 96 identifies a number of hits generated from the corresponding blog URL 98. Again, these hits may be limited by session. Alternatively, the blog URLs 98 can be displayed randomly, or in any other order including wherein a most popular blog web site 62 appears at the top of the blog URL listing 96. In another embodiment, the blog URL listing 96 includes the blog URLs 98 in reverse chronological order based on the date of the corresponding blog entry 68. Each blog URL 98 can be configured as a link 99 to the corresponding document provided at the blog URL.

A session count entry 101 identifies a total number of sessions at the merchant web site 22 resulting from a click-through to the product detail page 80 for the each of the products. For example, in the FIG. 4 embodiment, the product 75 having a session count entry 101, representing a total session count equal to 1190 appears at the top of the product listing 94, above other books wherein a lesser number of click-throughs to their respective product detail pages originated from the blogosphere 50. The session count is incremented when a user selects and is directed to the document located at the product link from a particular blog entry during distinct sessions.

In one embodiment of the present disclosure, the total session count for each product is referred to as a "blog score" for the product. The blog score can be determined for each product featured on the merchant web site 22 whereby the most blogged products (e.g., those creating the most "buzz or excitement") can be identified on the merchant website 22 by reviewing the blog scores of the products and determining which products have the highest blog scores. As shown in FIG. 4, the most blogged about book, or the book creating the most "blog buzz" or discussions in the blogoshpere 50 is identified at the top of the community commentary-books page 92A with a blog link 99 to each of the referral blog entries 68 identifying the product 75 and providing a link 78 to the product detail page 80 corresponding to the product.

Similarly, in some embodiments, a separate community commentary page is provided for each of a plurality of product types or categories (e.g., sporting goods apparel, electronics, etc.) available via the merchant website 22. For example, a retailer may feature a number of different product categories, thus a separate community commentary page 92 can be provided for each of the product categories wherein the products featured on the merchant website 22 are the subject of one or more blog entries 68. Thus, in reviewing a product to purchase, a customer 10 can review blog entries related to the product at the actual blog web site 62 wherein the blog entry was published.

Because a web-purchaser often has limited access to a sales person and customer reviews published on a merchant's web site may be subject to selective screening by an interested merchant, a community commentary page 92 in accordance with the present disclosure provides, among other benefits, another means of reviewing credible insight as to a product authored by uninterested third parties. Further, the community commentary page 92 informs the customer 10 of those products causing the most discussion or "blog buzz" in the blogosphere 50 at the present time. Thus, the hottest or most talked about products are easily identifiable via a community commentary page in accordance with the present disclosure.

Alternatively, the blog score for a product or a plurality of products, such as the most blogged products, can be determined for a period of time. For example, the most recent one hour, one day, one week, one month, etc. Although, the illustrated example refers to the blog score at the present time based on a total of all hits on the product detail page 80 since the product was made available on the merchant web site 22, the scope of the disclosed embodiments are not limited in this regard, as the blog score for a product or group of products can be determined for any period of time. For example, in calculating the blog score for a product, a "look back time" may be utilized wherein the blog score is determined based on the number of hits from some predetermined point in time in the past through the present. For example, in some embodiments, only clicks registered in the last sixty days may be used for calculating the blog score. Additionally, it may be desired to calculate a blog score over a range in time, for example, between predetermined start and end dates. Such an embodiment may, for example, be beneficial for tracking buzz over a historical period of time, such as a holiday season.

Further, the sample rate for updating the blog score for a product may be important in certain applications to accurately record the blog scores for certain products including hot selling products. For example, for products that have been available in the market for a long period of time, the blog buzz associated therewith may be somewhat limited or aged wherein accurately recording the associated blog buzz may be done by reviewing the hit counts and updating the blog scores only once a month. Whereas, for the newest or hottest selling products, maintaining an accurate blog score may require updating the blog score in real time, every hour or once per day.

Accordingly, in various embodiments of the present disclosure, the blog score for a product can be determined and/or updated using various methods depending on the product and/or product categories, how long the product has been on the market, as well as many other factors such as current events, market demands, etc. Accordingly, depending on various factors, the system and method of the present disclosure provides for accurate and up to date reporting of the blog score and the identification of blog listings for products associated with a merchant web site.

Figure 5:
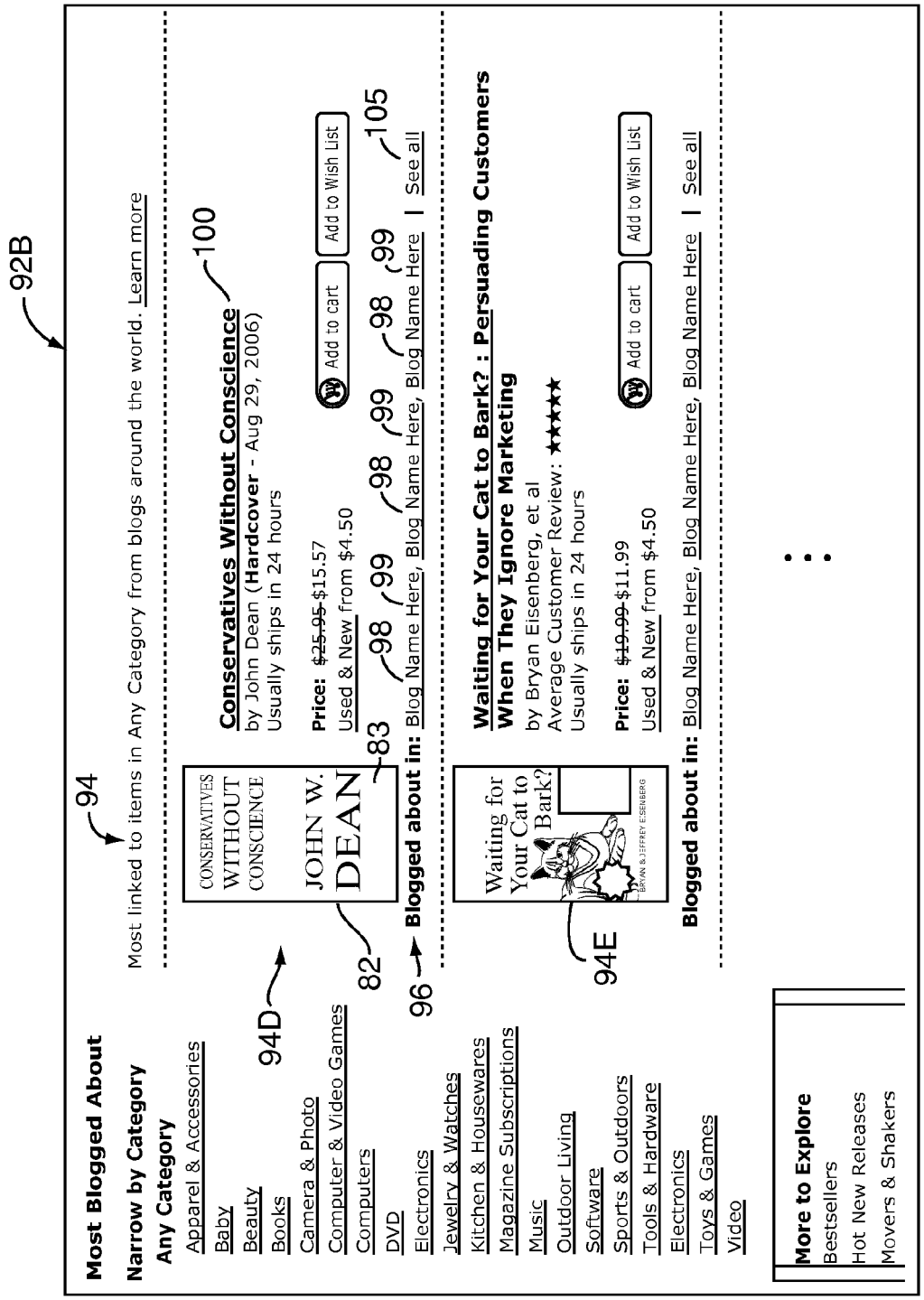
FIG. 5 is an illustration of another embodiment of a community commentary page in accordance with embodiments of the present disclosure.

FIG. 5 is an illustration of another embodiment of a community commentary page 92B in accordance with the present disclosure. The community commentary page 92B includes a product listing 94 for each of a plurality of books featured or offered for sale on the merchant website 22 which have been identified or discussed on a blog web site 62. Typically, the blog web sites 62 include a blog entry 68 identifying a product and a link to the merchant website 22 and/or product detail page as shown in the web document 64. (See FIG. 2). The product listing 94D is directed to the book *Conservatives Without Conscience* by John Dean and includes an image 82 of the product which is configured as a link 83 and a title line 100 which is also a link, both pointing to the corresponding product detail page 80 (FIG. 3) of the merchant website 22 for the product. Additionally, the product listing 94D includes a Referring Blog(s) listing 96 including one or more blog URLs 98 and blog links 99 pointing to various blog web sites 62 (FIG. 1) and pages thereof, which include the blog entry 68 (FIG. 2) referring to the product and/or including the link 78 to the corresponding product detail page 80 (FIG. 3) for the product listing 94D. The Referring Blog(s) listing 96 displays the blog URLs 98 in order based on a number of hits generated on the product description page for the product. In other embodiments, the order in which the blog URLs 98 are displayed can be based on other criteria such as the popularity of the individual blog web sites 62. The blog URL 98 may include a permalink wherein the blog link 99 points to a specific blog entry 68 even if the blog entry is no longer located on a front page of the blog web site 62. Alternatively, the blog URL 98 may include a blog link 99 pointing to the head of the referral blog web site 62.

In the FIG. 5 embodiment, the product listings 94 are displayed in descending order based on a number of hits generated on the product detail pages 80 of the associated products. Thus, the product listing 94E for a book entitled *Waiting for Your Cat to Bark?* by Bryan Eisenberg et al. is positioned below the product listing 94D for the book *Without Consent* as the number of hits generated from blog web sites 62 directed to the product detail page for the book *Without Consent* was greater than that for the Eisenberg et al. book.

Still referring to FIG. 5, a "See all" link 105 points to another community commentary page 92C wherein all blog web sites 62 including the link 78 (FIG. 2) to the featured product are identified as numeral 99. (See FIG. 6). The community commentary page 92C is directed to a single product, e.g., the book entitled: *Waiting for Your Cat to Bark?* by Bryan Eisenberg, et al. and includes an image 82 of the book and a link 83 to the corresponding product detail page 80 (FIG. 3).

Figure 6:
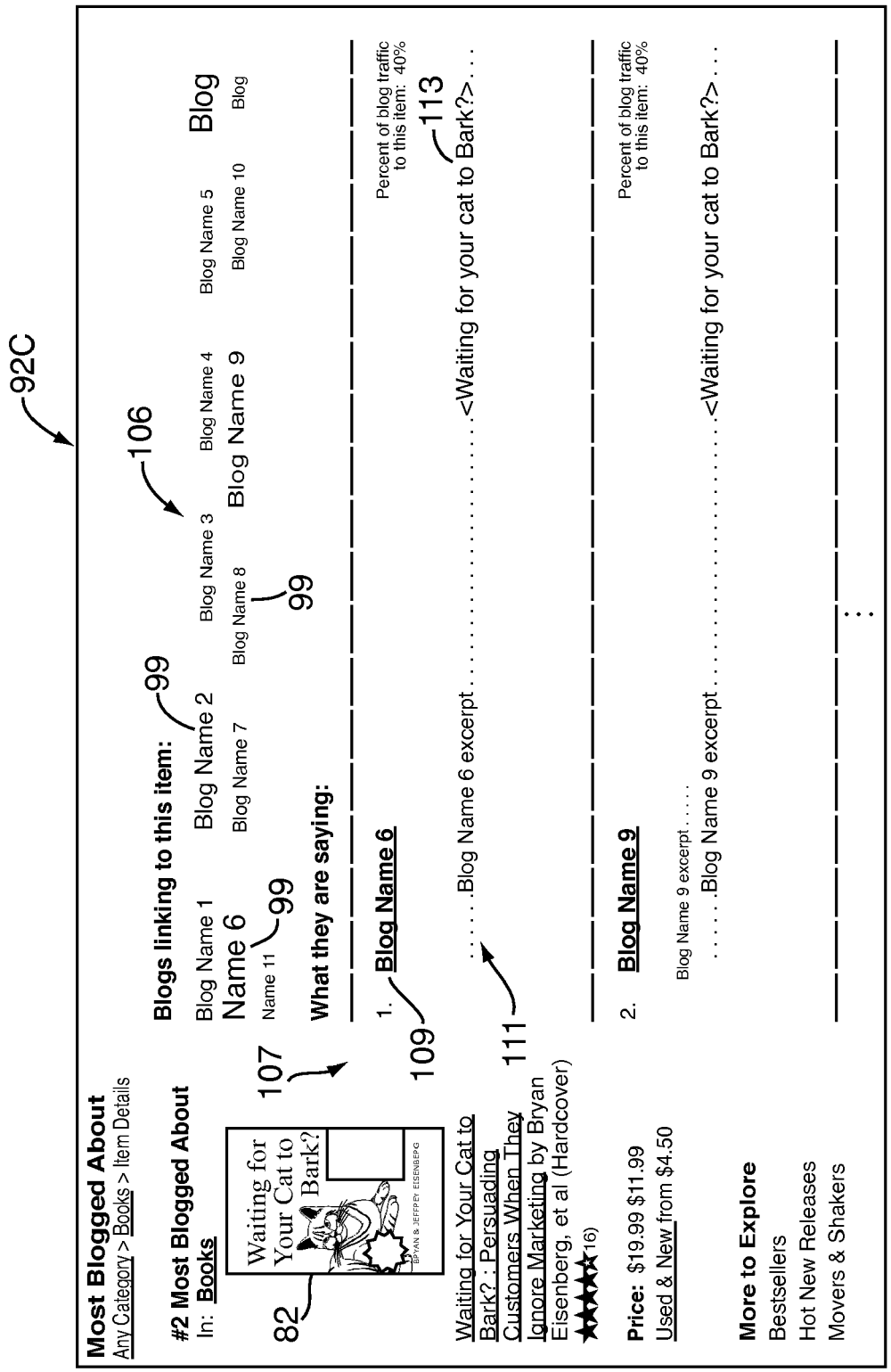
FIG. 6 is an illustration of another embodiment of a community commentary page in accordance with embodiments of the present disclosure.

Referring to FIG. 6, additionally, the community commentary page 92C displays a blog listing 107 including an entry 109 identifying each blog web site 62 having the link 78 (FIG. 2) pointing to the product detail page 80 corresponding to the Eisenberg et al. book within the content thereof. The entry for each blog web site 62 includes an excerpt 111 including the portion of text 113 of the article or blog entry 68 identifying the Eisenberg et al. book. In the illustrated embodiment, each of the entries 109 are displayed in descending order based on a number of hits generated on the product detail page for the Eisenberg et al. book.

The community commentary page 92C also includes a cloud or window 106 including a blog link 99 pointing to each of a portion of blog web sites 62 having a link 78 within the content thereof pointing to the product detail page for the Eisenberg et al. book. In the FIG. 6 embodiment, the window 106 includes blog links 99 for each of eleven blog web sites 62 (blog name 1-11) which have generated the most number of hits to the product detail page 80 for the book. As shown in the window, the blog links 99 are displayed in varied font sizes based on a number of hits generated at the product detail page 80 from each of the corresponding blog web sites 62. For example, the blog link 99 for the "Blog Name 6" is displayed in the largest font indicating that Blog Name 6 has generated the most hits on the product detail page 80 for the Eisenberg et al. book. The blog link 99 may point to a section of the same page corresponding to the blog identified in the link or to the blog web site 62 itself.

Figure 7:
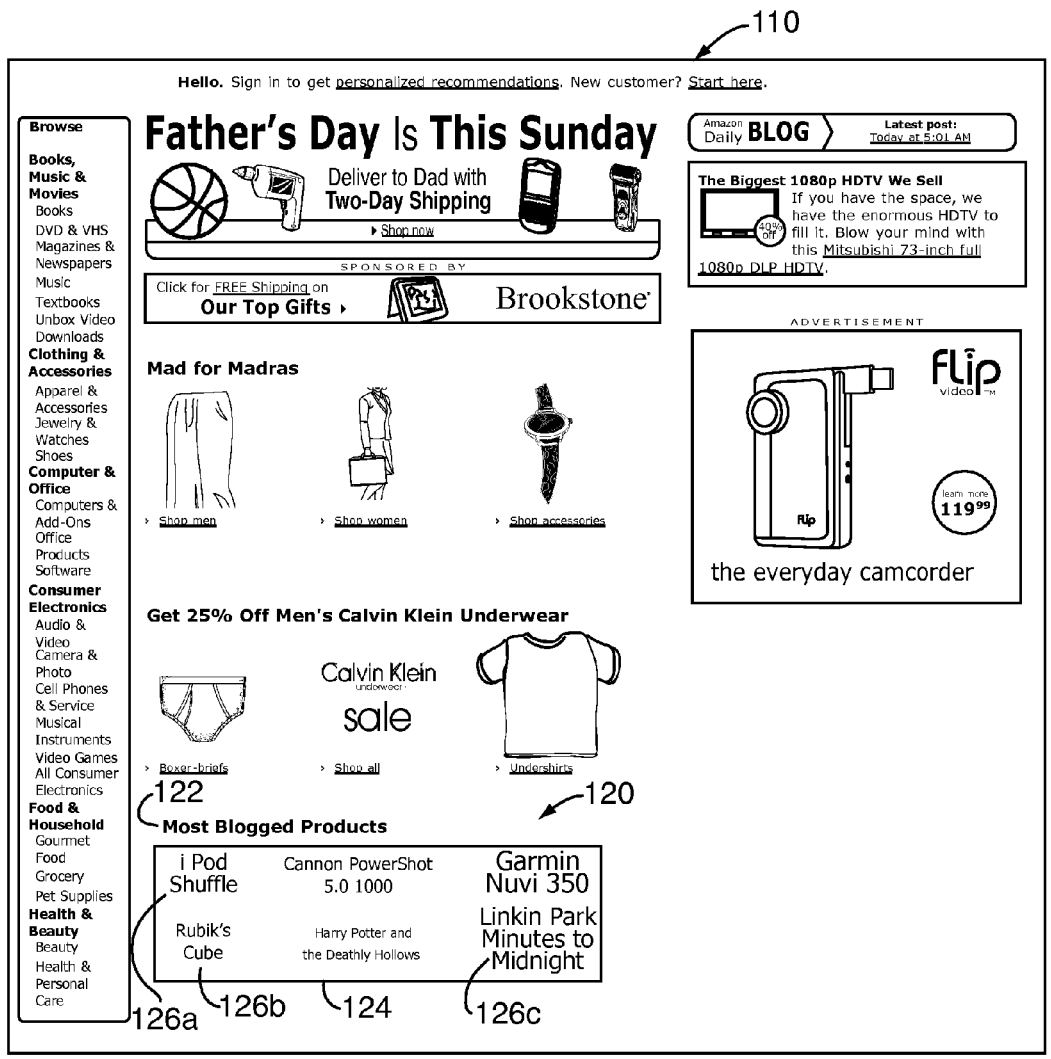
FIG. 7 is an illustration of one embodiment of a product selection screen in accordance with embodiments of the present disclosure including the display of a most blogged products window having a plurality of selectable links, each link identifying a product and pointing to a community commentary page having an entry directed to the corresponding product.

Referring to FIG. 7, in one embodiment of the present disclosure, the products offered for sale on the merchant web site 22 having the most hits or click-throughs at their respective product detail pages 80 originating from the blogosphere 50 (those with the highest blog scores) are identified together as a group on a home page 110 or main product page on the merchant website 22 in a "most blogged cloud" 120. The most blogged cloud 120 includes a title line 122 reciting the title "Most Blogged Products" and a window or screen section 124 including a display of links 126 which also provide a brief description of the product. For example, the product iPod Shuffle is identified via the link 126A which points to a community commentary page similar to that of FIG. 4 featuring all of the products identified in the most blogged cloud 120 and in particular to a product listing 94 corresponding to the product iPod Shuffle. The number of links 126 presented in the most blogged cloud 120 can be filtered to include a maximum number of links, e.g. the top ten or the top twenty blogged products could be featured. In the FIG. 7 embodiment, the links 126 are presented in different size fonts wherein the size of the font is largest for the most blogged product and decreases in size for products generating less "buzz" and having a lower blog score. Thus, in the FIG. 7 embodiment, the product with the highest blog score is displayed in the most blogged cloud 120 with a link 126 to the corresponding community commentary page 92 is represented in the largest font. In other embodiments, various colors or other enhancement features can be included with the displayed links 126 to identify or draw attention to the links corresponding to the products with the highest blog scores. In some embodiments, the most blogged cloud 120 can include an ordered list of links 126 wherein the order thereof is related to the blog score of the associated products.

Similarly, a most blogged cloud 120 can be featured on the main page of a product category such as "Jewelry and Watches" for example, wherein the most blogged items of jewelry and watches are featured in a cloud format. In one embodiment, a most blogged cloud 120 would not appear on a web page associated with a product category wherein the number of total blog entries 68 related to all of the featured products in the category is less than a predetermined minimum number. Thus, if there is not enough "blog buzz" to warrant a most blogged cloud 120, the cloud will not be displayed on the web site.

If a single product has not generated a minimum number of hits originating from the blogosphere 50 to warrant inclusion in a most blogged cloud 120, a combination of products in a sub-category which collectively have generated the minimum number of hits can be identified in the most blogged cloud 120 via a sub-category identifier or other appropriate identifier with a link to a product viewer wherein images of each of the collectively identified products are displayed including links to a corresponding product listing 94 for each of the individual products on an associated community commentary page 92. This arrangement is described more fully in connection with tag clouds for use with recommended items in co-pending U.S. patent application Ser. No. 11/693,063 entitled Method and System for Providing Item Recommendations filed Mar. 29, 2007, the disclosure of which is incorporated herein by reference in its entirety.

In another embodiment of the present invention, the most blogged items are displayed in a list format on one or more of the pages of the merchant web site 22. For example, if only a few products in a particular category are creating blog buzz sufficient to warrant a product listing on an associated community commentary page 92, these products are identified in a list format wherein a "Most Blogged Products" list identifies the most blogged products in a category and provides links to the corresponding community commentary pages. In one embodiment, even if only one blog web site 62 includes a blog entry 68 from which a hit on a corresponding product web page 80 is generated, the product is included in a "Blogged Products" listing. Similar to the "Most Blogged Products" list, the Blogged Products listing identifies the blogged products and provides links to the corresponding community commentary pages 92.

In the above-identified embodiments, the most blogged products are identified by ordering the products based on the number of hits or click-throughs at the product's detail page 80 originating from a referral blog web site 62. One method includes identifying each hit or referral at the product detail page 80 of the merchant web site 22 and looking back at the referring URL to determine whether or not the referral URL is a blog site 52. Those hits originating from a blog web site 62 are counted towards the blog score for the target product. Hits from referral URLs which are not blog web sites or not approved blog web sites are not counted towards the blog score for the product. In another embodiment, hits from advertisements are also included in the blog score for a product, but are not counted equally with those hits originating from a link within the content of a blog entry. For example, hits from an advertisement may be counted as one-half of a hit, or some other fractional portion of a hit towards the blog score for a product. Alternatively, in another embodiment of the invention, hits from advertisements may not be counted at all towards the blog score.

In one embodiment, the system of the invention retrieves all hits on a product's detail page 80 for a predetermined period of time (e.g., the previous day) and filters out those referrals originating from non-blog sites and from other sites or URLs which are not intended to be included in the blog score for a product. For example, hits originating from the merchant's own web site, or a blog portion thereof, may not be counted towards the blog score of a product. Depending on the application, and how much buzz a particular product is creating in the blogosphere 50, the referral URLs can be retrieved and sorted for shorter or longer periods of time. For example, for products which have been on the market for a while, calculating a blog score for the product and updating a corresponding community commentary page once a month may be sufficient. On the other hand, a newly discovered product can create a large amount of blog buzz in a single afternoon wherein the product should soar to the top of a most blogged products list. Accordingly, in some applications, or for certain products or categories of products, it is desirable to calculate the blog scores for the hottest products more frequently than once a day or in real time as new hits on a product's detail page 80 occur.

Further, the hits originating from referral URLs are filtered so that only one hit per session on the merchant web site 22 is counted. Thus, if in a single session a user causes multiple hits on the product detail page 80 for the product 75, only a single hit is added to, or counted towards the blog score for the product during the session.

Embodiments of the present disclosure also provide means for screening all referral URLs prior to publicly associating the referral URL with the merchant website 22. Prior to counting the URL towards a buzz score for a product and posting a listing to the referral URL within a community commentary page 92 associated with the merchant website 22, each referral URL is reviewed as to content and subject matter. First, the referral URL is reviewed to determine whether or not the referral URL is a blog site 52. Additionally, the referral URL website is screened to determine if the referral website contains content which may be offensive to the customers and/or management of the merchant website 22. For example, if the merchant website 22 is a family oriented web site wherein a young person or child may be a customer 10 or a viewer of the web site, referral URLs which are associated with websites containing adult rated content or otherwise offensive material are screened to prevent such a website from being featured on community commentary page 92 and/or hits therefrom being included in a blog score for a product. Alternatively, for other types of merchant web sites 22, the referral URLs may be filtered using other screening parameters.

Various methods for determining whether or not a referral URL is a blog site 52 which should be included in the blog URL listing 96 of a community commentary page 92 and hits therefrom counted in the blog score for a product can be used with embodiments of the present disclosure. In one embodiment, a third party Internet search engine specialized in searching and indexing blog sites is employed to provide a current listing of authenticated blog sites. Each referral URL generating a hit at the merchant web site 22 is then compared with the blog site listing provided to determine whether or not the referral URL constitutes a legitimate blog site 52. The website www.technorati.com is one example of an Internet search engine directed to blogs that can be utilized to authenticate referral URLs as legitimate blog sites 52. Other similar Internet search or indexing sites, may also be used for identifying referrals from legitimate blog sessions.

In another embodiment, each referral URL can be authenticated as a blog site 52 by accessing the referral URL and performing an analysis of the resulting document to determine whether it is a legitimate blog site. For example, the analysis could include searching the location for successively decaying time entries (reverse chronological) or other factors that may be indicative of a blog site 52 or otherwise identify a legitimate blog site. Thus, each referral URL is accessed and authenticated as a qualified blog site 52 prior to a link thereto being posted on a community commentary page 92 associated with the merchant web site 22 and any hits therefrom counting towards a blog score for a product 75 identified thereon.

In accordance with the present disclosure, referral URLs identified as blog sites 52 and the web sites associated therewith are categorized based on the subject matter and content thereof for ensuring that inappropriate or otherwise offensive content is not published on a community commentary page 92 and thereby associated with a merchant website 22. In one embodiment, all referral URLs are classified using a content classification including a White List, Grey List or Black List classification for each web site based on the subject matter and/or content thereof. Referral URL websites that are known and considered to include appropriate content are labeled as White List sites. In one embodiment, a manual review of the referral URLs is employed prior to labeling a website as a White List website. Hits from referral URLs identified as White List sites are counted toward a product's blog score and links to the referral URL are posted on a community commentary page 92 within the blog URL listing 96.

Those referral URLs which are unknown are initially classified as Grey List sites. In one embodiment, hits from referral URLs originating from Grey List sites are counted towards a product's blog score but the referral URL, nor links thereto, are posted on the community commentary page 92 associated with the product. Thus, Grey list sites are filtered from being displayed by the web site. Not posting Grey List sites on the community commentary pages 92 ensures that content that is not known to be appropriate is not associated with the merchant web site 22. Grey List sites can be upgraded/downgraded to White List/Black List sites upon further review of the site by an administrator of the merchant web site 22 or by other means described hereinafter.

Black List web sites are those referring web sites which are known to contain inappropriate content. Hits generated from URLs identified on a Black List are not included in a products blog score. Referral URLs are filtered to identify Black List web sites so that URLs corresponding to Black Listed web sites, nor links thereto, will appear on a community commentary page 92 associated with the merchant website 22. In one embodiment, the filtering of referral URLs includes comparing referral URLS with URLs from blogs and other web sites which are known to be directed to adult content or otherwise contain content which is determined to be inappropriate with respect to the expectations of the customers 10 of the merchant web site 22.

Additionally, a Grey List URL can be downgraded to a Black List following an actual review of the Grey List URL. In other embodiments, algorithms, including learning algorithms, are utilized to automatically identify URLs including blog sites 52 which meet certain pre-determined characteristics such that the URL is classified with a Black List content classification. Thus, in one embodiment of the system, a Black List content classification can be determined automatically utilizing algorithms or other comparison means whereas, a White List classification will result after an actual administrative review of the content of the URL to be White Listed. However, the disclosed embodiments are not limited in this regard, as automated means can also be utilized to determine a White List content classification depending on the subject matter and content of the merchant web site 22 and the expectations of the administrators and customers thereof.

The referring URL for each hit on the product detail page 80 of the merchant web site 22 is identified and stored along with a corresponding content classification for use by the administrator of the merchant web site. In one embodiment, a product identification number (or ASIN) for the target product, as well as the content classification for each referral URL is stored via the merchant server 24 for viewing and analysis by administrators of the merchant web site 22. The stored information provides an unfiltered view of the URL referral data. For each product, a listing of all referral URLs is provided regardless of the content of the referral URL website and the content classification thereof. This information is periodically reviewed and compared with the actual content of the URL websites for accuracy. The content classification of a referral URL can be upgraded or downgraded based on a review of the URL web site by an administrator or via an automatic content screening process.

In another embodiment, a reputation system evaluates referral blog sites 52 for use in connection with the merchant web site 22. The reputation system allows a user of the merchant website 22 to rank or otherwise comment as to the credibility or content of a referral blog site 52 and based on the user input, either by itself or in combination with other user ratings or input, the content classification of a referral URL is upgraded or downgraded. Additionally, a URL listing 96 can be removed from a community commentary page 92 based on user feedback via the reputation system. In one embodiment, a customer 10 of the web site 22 is allowed to flag a referral URL 98 wherein the flag can be used to determine or update the classification of the referral URL. For example, in some embodiments, users may be provided with a user interface control, such as a "report this blog entry" button. By selecting this button, the web site 22 is notified of potentially problematic blog sites. If a particular blog entry obtains a threshold number of reports from users, the blog entry (or the entire blog site) may be placed on the grey or black list.

In one embodiment, the blog score for a product does not include hits originating from advertisements. Thus, referral URLs are filtered to remove those URLs which constitute advertisements which may include advertisements displayed on blog web sites 62 or other web sites and generate hits on the product detail page 80 for a product. For example, if a blog web site 62 includes an advertisement for the product 75 displayed on one or more pages thereof, and the advertisement includes a link to the product detail page 80 of the merchant web site 22 for the product 75, then one or more filters are provided to identify any hits generated from such an advertisement. In one embodiment, this type of filtering is accomplished by looking back at the referral URL and determining if the same URL appears on more than a threshold number of web pages of the referring web site. If for example, the referral URL appears on five or more web pages of the referral site and in the same or similar location, then the referral URL is assumed to be an advertisement and is not included in the community commentary nor counted towards the blog score for the associated product. This filtering technique assumes that blog entries 68 would normally not include a link to a product detail page 80 for the same product on more than five different pages of the blog web site 62.

In some embodiments, hits from advertisements are used to calculate a product's blog score. However, hits from advertisements are typically weighted differently than those hits from actual blog sessions depending on the particular application. For example, a hit from an advertisement may count as one-half hit, or other fraction thereof, whereas as a hit originating from a blog entry 68 may be counted as a full hit.

Figures 8, 8A:
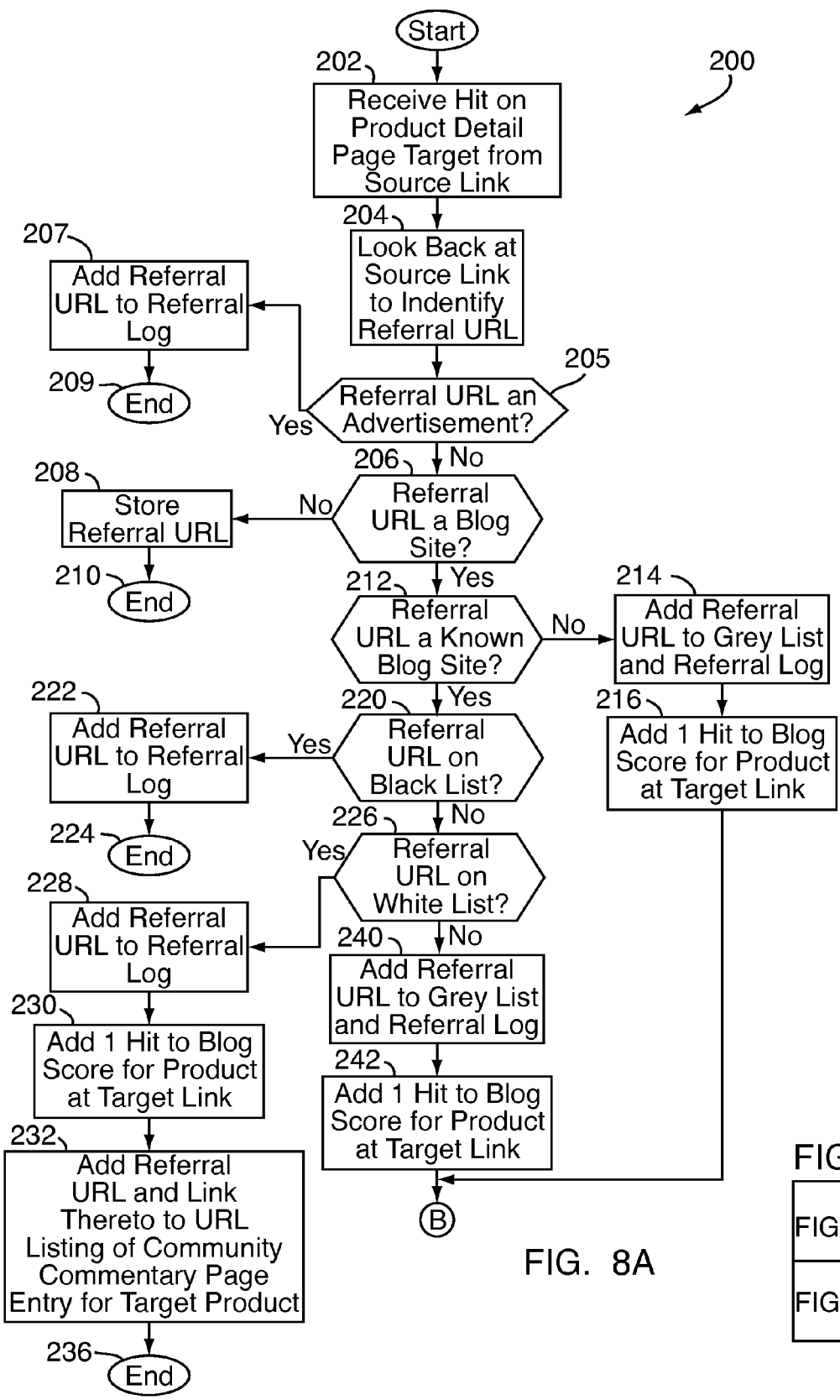
FIG. 8 including
FIGS. 8A and 8B, is a flow chart of one embodiment of a process for providing a community commentary page identifying referral URLs generating hits on product detail pages of an interactive catalog in accordance with embodiments of the present disclosure.
Figure 8B:
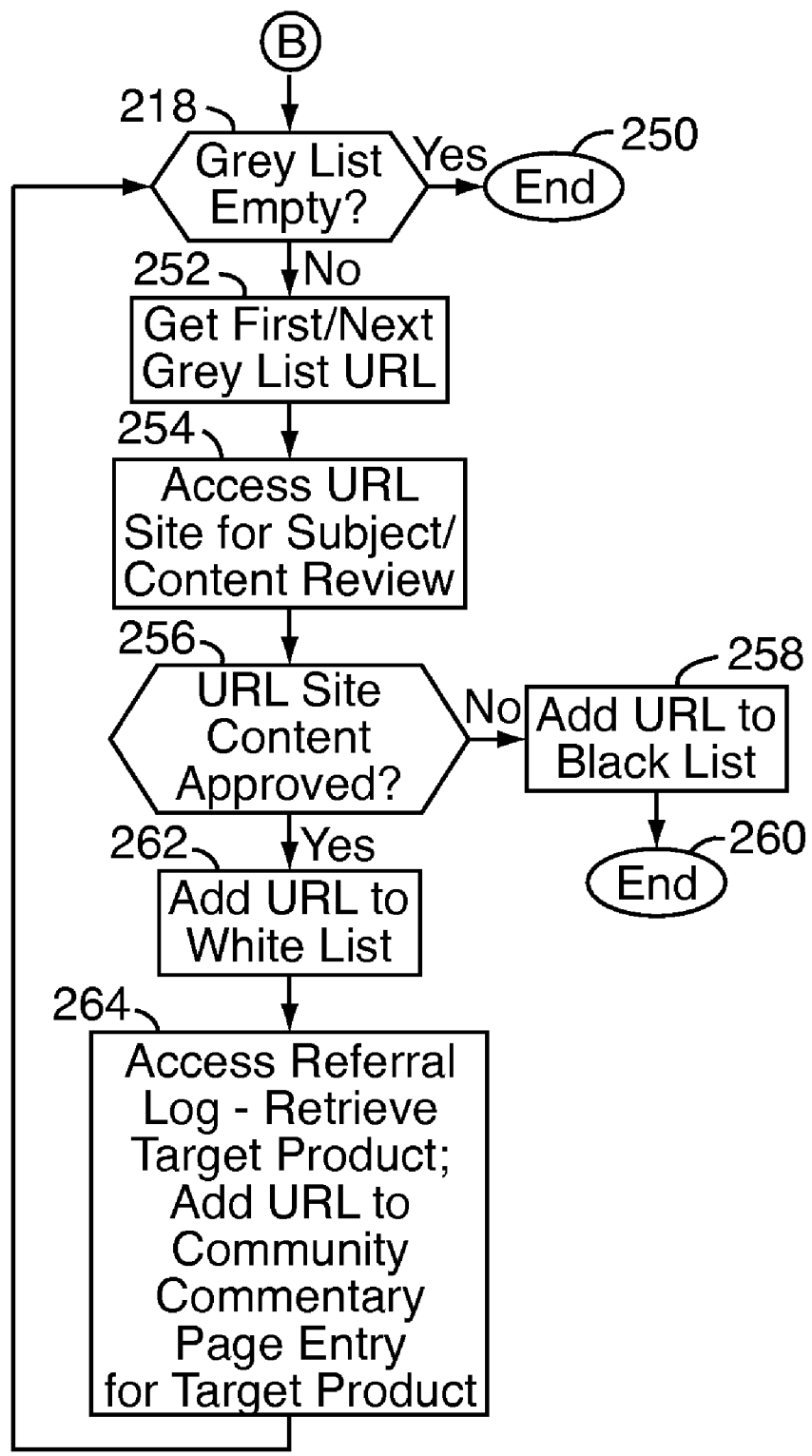

Referring to FIG. 8, a flow chart 200 illustrates one embodiment of a process for displaying the community commentary page 92 (FIG. 4) for customer review in accordance with the system and method of the present disclosure. The process begins at block 202 when a hit is received on a product detail page 80 of the merchant web site 22 originating from a source link (e.g., a blog site 62 or other site). The product detail page 80 (FIG. 3) provides a description of a corresponding "target product" and is therefore also referred to herein as the "target". At block 204, the process includes looking back from the target link to the source link via session data to identify the referral URL of the source link. Thus, the source link is embedded or otherwise associated with the referral URL. The process can include crawling back to the referral URL to determine blog titles, post titles, and identify and retrieve excerpts from the blog entries at which the target URL is listed or otherwise identified within the content of the blog web site 62. In one embodiment, the process includes creating a feed file for storing/organizing the referral URL for each hit. Typically, the feed file is organized or sorted based on the associated target product as well as the session type or source link as the blog buzz corresponding to the target product is the information sought.

At block 205 a determination is made as to whether or not the referral URL is an advertisement. If yes, the referral URL is added to the referral log at block 207 and ends at block 209. If the referral URL is not an advertisement, the process continues at block 206.

At block 206 a determination is made as to whether or not the referral URL is a blog site 52. Various methods are employed for determining if the referral URL is a blog site 52 as set forth hereinabove.

If the referral URL is determined not to be a blog site 52, the process stores the referral URL in a feed file or referral log at block 208 and ends at block 210. Otherwise, if the referral URL is identified as a blog site 52, the process continues at block 212 wherein the referral URL is compared to stored White List and Black List data. If the referral URL is not identified on the White List or Black List, the process adds (stores) the referral URL on a Grey List as well as the referral log. (Block 214). The referral log includes a stored copy of the URL of the source link for all hits on the merchant website 22. Thereafter, the process continues at block 216 wherein the blog score for the target product is increased by one corresponding to the Grey List hit received. In this embodiment, hits from Grey List referral URLs are counted towards a blog score for a product even though the unknown Grey List URL is not identified or linked at the community commentary page 92 for the target product. The process continues at block 218 wherein the Grey List is traversed for reviewing the content of the Grey List URLs as discussed further hereinbelow.

If at decision block 212 the referral URL is identified as a known blog site 52, the process continues at block 220 wherein the referral URL is compared to the Black List URLs. If the referral URL matches a Black List URL, the process adds the referral URL to the referral log at block 222 and ends at 224.

If the referral URL does not match the Black List data at block 220, the process continues at block 226 wherein the referral URL is compared to the White List data. If the referral URL is determined to match a White List URL, the process continues at block 228 wherein the referral URL is added to the referral log. Thereafter, at block 230 the blog score for the target product is increased by one corresponding to the hit from the White List referral blog site. Additionally, at block 232 the referral URL is added to the URL listing 96 on the community commentary page 92 for the target product as well as a link to the source link at the referring URL. Also at block 232, if not already present, a community commentary button (link) 90 is attached for display with the product detail page 80 corresponding to the target product. The process ends at block 236.

If at block 226, the referral URL does not match any of the URLs stored on the White List, the process continues at block 240 wherein the referral URL is added to the Grey List as well as the referral log. At block 242 the blog score for the target product is increased by one corresponding to the hit from the Grey List blog site 52. The process continues at block 218 wherein the Grey List is traversed for reviewing the content of the Grey List URLs as set forth following.

At block 218 a determination is made as to whether or not the Grey List contains URLs stored therein which correspond to blog sites 52 having content with subject matter that is unknown to the administrators of the merchant web site 22. If the Grey List is empty, the process ends at block 250. Otherwise if one or more URLs are stored in as Grey List data, the first/next URL of the stored data is retrieved at block 252 for further review. At block 254, the system accesses the website at the referral URL for reviewing the subject matter and/or content thereof. In one embodiment, a manual review of each referral URL web site is required for assessing the appropriateness of the subject matter and/or content of the website prior to White Listing the referral URL. Alternatively, an automatic screening process is performed on the content of the referral URL to determine if the website should be placed on either the White List or Black List. Regardless of the method, the referral URL is reviewed and categorized as either a White List or Black List blog site and stored accordingly.

At block 256 a determination is made as to whether or not the content of the referral URL is approved as White List material. If the content is not approved, the process continues at block 258 wherein the referral URL is added to and stored on the Black List. Thereafter, the process ends at block 260.

If the referral URL content is approved as White List material at block 256, the process continues at block 262 wherein the referral URL is stored on the White List. At block 264, the referral log is accessed to identify the target product associated with the referral URL. The referral URL, including a link thereto, is then added to the community commentary entry for the target product. As set forth above, the number of hits generated from a referral URL determines the position of the referral URL in the blog Listing 96. The process returns to block 218 to retrieve and review a next referral URL stored in the Grey List. The process ends following review of all of the Grey Listed referral URLs.

In the above-identified embodiment, if the referral URL is determined to be an advertisement, the hit generated therefrom is not counted towards the blog score for the product. Alternatively, in other embodiments, if the referral URL is determined to be an advertisement, the hit generated therefrom may be weighted prior to counting towards the blog score for a product. For example, an advertisement may count as ½ of a hit, whereas a hit generated from a blog entry would count as a full hit. Further, in other embodiments, advertisements may only be counted towards the blog score of a product if displayed on a blog site 62. Thus, hits generated from advertisements displayed on the merchant's own web site or the web site of an associated merchant would not count towards the blog score for a product.

As set forth above, in one embodiment, the system classifies the source link as an advertisement if the source link appears more than a predetermined minimum number of times on the referring web page. Alternatively, other methods may be employed to determine if the referral URL is an advertisement for the target product. For example, if a source link is located on a far left or right column of a web page, the source link may be classified as an advertisement.

While the embodiments described herein are directed to measuring the activity generated from blog sites, the system and method disclosed herein can also be employed to measure activity generated on a merchant's web site from various other types of commentary pages. For example, hits generated from deal sites including aggregators of information related to product prices on various merchant's web sites could be quantified. Further hits generated from news sites could be measured. For example, a news article directed to, or reporting on the performance of a particular medication, might link to a product web page on a merchant's web site from which a person might purchase the medication or find further information regarding the medication. Accordingly, the system and method disclosed herein could be utilized to measure the number of hits generated from various types of commentary pages wherein the content thereof is provided by persons or entities other than the merchant or merchant web site offering for sale or selling goods or services.

Furthermore, although embodiments herein are described as relating to products in a product catalog, many other embodiments are possible. For example, among others, the items in the catalog could comprise personal profiles (e.g. on a social networking website), news articles (e.g. from a news website), or multimedia (e.g. for a website showcasing user or web site generated media). Accordingly, the described embodiments may be used to rank items (i.e. user profiles, video clips, news articles, etc.) receiving the most "buzz" from other websites. In this way, for example, a user could easily see which blog or news sites are referring the most people to the user's profile, video clip, and or news article.

Additionally, the system and method disclosed herein also includes security means to prevent manipulating the system to create an inflated blog score for a product or to draw attention to a particular blog site 62. Various security measures can be employed including monitoring the session information causing hits on the merchant web site such that only one hit is counted towards a blog score for a product per session from a referral URL. Additionally, limits can be placed on the number of hits counted from a particular advertisement if, for example, a particular advertisement is generating a predetermined number of hits greater than other similar advertisements.

Any process descriptions, steps, or blocks in flow diagrams should be understood as potentially representing modules, segments, or portions of code which include one or more executable instructions for implementing specific logical functions or steps in the process, and alternate implementations are included within the scope of the preferred embodiments of the systems and methods described herein in which functions may be deleted or executed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present invention and protected by the following claims.

The invention claimed is:

1. A computer implemented method comprising:
    under control of one or more computer systems configured with executable instructions for performing the following steps:
    identifying a referral address for each click-through to at least one product page of an interactive catalog;
    for each product page, identifying each of the referral addresses corresponding to a commentary page having a hyperlink to the product page within the content thereof;
    determining a total number of click-throughs to each of the product pages originating from the commentary pages over a predetermined period of time;
    causing the display of a list of at least one of the products identified on the product pages and the corresponding referral address of each of the commentary pages generating click-throughs thereto, the list being ordered in descending order based on the total number of click-throughs.

2. The method of claim 1 wherein the step of causing the display further comprises ordering the referral addresses based on a number of click-throughs on each of the product pages originating therefrom.

3. The method of claim 1 including providing a hyperlink to each of the referral addresses corresponding to the commentary pages identified in the list.

4. The method of claim 1 including causing the display of an excerpt of the content of at least one of the commentary pages including a portion of the content containing the hyperlink to the product page.

5. The method of claim 1 further comprising screening the commentary pages based on the subject matter of the content thereof.

6. The method of claim 1 wherein the commentary page is selected from a group consisting of a blog site, a news site, and a deal site.

7. The method of claim 1 wherein the number of click-throughs is limited such that only one click-through per a session on the interactive catalog is counted towards the total number of click-throughs.

8. The method of claim 1 wherein the number of the number of click-throughs are counted at certain times based on a predetermined sample rate for updating the number of click-throughs.

9. The method of claim 3 further comprising causing the display of a window including a hyperlink to a plurality of the referral addresses corresponding to the commentary pages.

10. The method of claim 9 wherein the hyperlinks are displayed in varying size fonts depending on the number of click-throughs on the product page originating from the corresponding commentary page.

11. The method of claim 1 further comprising filtering the referral addresses to remove referral click-throughs originating from advertisements.

12. A computer system having a computer that executes a computer program causing the computer system to perform a method, comprising:
    under control of one or more computer systems configured with executable instructions,
    identifying a referral address for each click-through to at least one item page of an interactive catalog;
    for each item page, identifying each of the referral addresses corresponding to a commentary page having a link to the item page within the content thereof;
    determining a total number of click-throughs to each of the item pages originating from the commentary pages over a predetermined period of time;
    causing the display of a list of at least one of the items identified on the item pages and the corresponding referral address of each of the commentary pages generating click-throughs thereto, the list being ordered based on the total number of click-throughs.

13. A computer readable storage medium having a computer executable component for causing one or more computer systems to perform a method, comprising:
    under control of one or more computer systems configured with executable instructions,
    identifying the referral URL for each hit generated on each of a plurality of item pages of an interactive catalog;

for each product page, identifying each of the referral URLs corresponding to a commentary page having a link pointing to the item page within the content thereof;

determining a total number of hits on each of the item pages from one or more of the commentary pages over a period of time;

causing the display of a list of items in an order associated with the total number of hits on each of the respective product pages.

14. The computer readable medium of claim 13, wherein the item is at least one of a product, a personal profile, or a news article.

15. The computer readable medium of claim 14, wherein the interactive catalog is at least one of a product catalog, a user profile catalog, a news article catalog, or a catalog of multimedia.

\* \* \* \* \*